June 13, 1961

E. F. KIRBY 2,987,919

OVER TEMPERATURE CONTROL UNIT

Filed Jan. 29, 1957

EDWARD F. KIRBY,
INVENTOR.

BY R. E. Geauque

ATTORNEY

June 13, 1961  E. F. KIRBY  2,987,919
OVER TEMPERATURE CONTROL UNIT
Filed Jan. 29, 1957  2 Sheets-Sheet 2
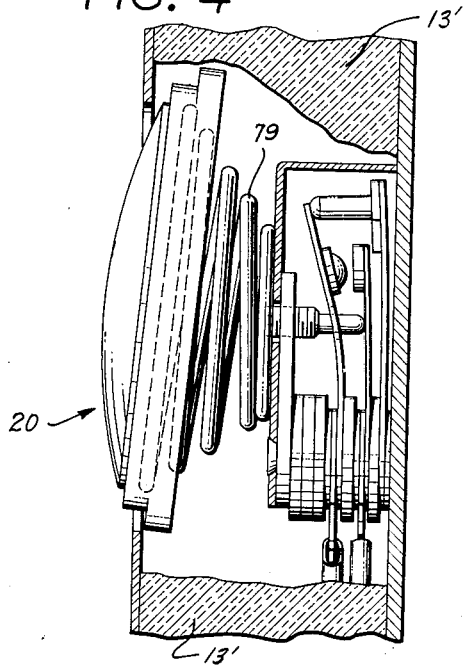
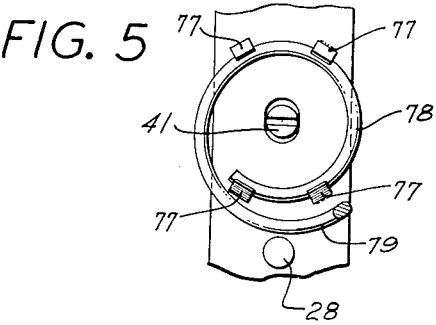
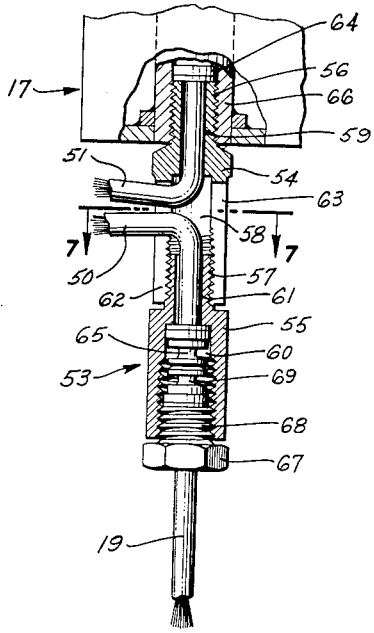
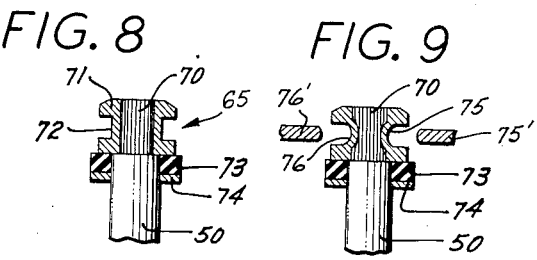
EDWARD F. KIRBY,
INVENTOR.
BY R. E. Geauque
ATTORNEY

United States Patent Office 2,987,919
Patented June 13, 1961

2,987,919
OVER TEMPERATURE CONTROL UNIT
Edward F. Kirby, North Hollywood, Calif., assignor, by mesne assignments, to General Controls Co., Glendale, Calif., a corporation of California
Filed Jan. 29, 1957, Ser. No. 637,043
5 Claims. (Cl. 73—343)

This invention relates to an over temperature control unit and more particularly to a control unit for preventing excessive temperatures from developing in hot water heaters.

At the present time, bimetallic thermostat controls are utilized to sense the temperature at the top, exterior surface of the inner tank of a water heater. These bimetallic members are held adjacent the exterior surface of the inner tank by a bracket which is welded either to the top or to the upper end of the inner tank. Thus, it is necessary to install the bimetallic control unit prior to the installing of the insulation and outer jacket around the inner tank. It is customary, in installing the insulation and outer jacket, to place these components on a shoe of somewhat larger diameter of the inner tank and then slip the shoe over the tank. Thereafter, the shoe is removed to permit the insulation to expand within the space between the outer jacket and the inner tank. Since the bracket for the bimetallic control unit is welded directly to the tank, the bracket is often damaged by the shoe. Also, since the leads for the bimetallic unit must be attached prior to installing the insulation and outer jacket, it is difficult to locate the leads after assembly of the heater. The ends of the leads usually pass through an opening at the lower end of the outer jacket and it is necessary to locate the leads within the insulation space with a hooked wire or similar instrument in order to pull the end of the leads through the opening. Also, if the bimetallic unit should become damaged or inoperative for any reason after assembly of the heater, the repair of the unit requires either removal of the top or outer jacket.

By the present invention, an over temperature control unit is provided which can be installed in position after the outer jacket and insulation have been installed on the inner tank. The bimetallic control unit can be inserted into position against the surface of the inner tank through an opening in the outer jacket and firmly held in position against the inner tank, regardless of the thickness of the insulation space between the inner tank and the outer jacket. Since an opening exists in the outer jacket, both at the location of the bimetallic control unit and at a lower portion where the leads for the unit connect with the main control unit, the leads for the bimetallic control unit can be attached at these two openings prior to the assembly of the insulation and outer jacket onto the shoe, and once these components have been placed around the inner tank and the shoe removed, the leads are in position to be hooked to the main control unit and to the bimetallic control unit.

The bimetallic unit is mounted by a casing, the edges of which are forced against the inner jacket to position the bimetallic element a slight distance away from the surface of the tank itself. The casing for the bimetallic unit is maintained in contact with the inner tank by means of a spring which is secured to a cap member located in the opening in the outer jacket opposite the unit. The opening is slightly larger than the cap member so that the cap member can be tipped and inserted into the opening and thereafter straightened out so that flanges on the edge of the cap member can engage the interior surface of outer jacket at the opening in order to hold the cap member in position. A spiral spring is utilized between the cap member and the casing for the bimetallic unit, and this spring is capable of maintaining sufficient center pressure on the bimetallic unit, regardless of variation in the insulation space between the inner tank and outer jacket, to hold the bimetallic unit against the inner tank to sense the temperature of the tank. The thickness of the insulation space in present tanks varies from about ¾ to 1½ inches so that one spring can be utilized for all tanks.

Thus, the over temperature control unit of the present invention is simple and easy to install on the hot water heaters and automatically adjusts to variations in insulation thickness. The over temperature control unit can be generally utilized for sensing an internal temperature of any equipment having outer support for the cap member and an inner surface or location for contact by the casing of the bimetallic unit.

The main temperature control unit for water heaters has a thermostat element placed within the tank to maintain the proper water temperature within the tank by controlling the supply of gas to the burner. Also, a thermocouple is placed in the pilot burner flame and is connected with the main temperature control unit to provide a voltage to operate the main unit.

The bimetallic over temperature control unit of the present invention overrides the main temperature control unit when the temperature at the top of the tank becomes too high and there is danger of the explosion of the tank. The over temperature control unit is placed in series with the thermocouple lead so that if the temperature gets too high, the bimetallic control unit will open the circuit between the thermocouple and the main control unit in order to cut off the burner. A novel fitting or junction block is provided at the end of the leads for the over temperature control unit of the present invention which permits the leads of the over temperature control unit to be easily and quickly connected in series with the thermocouple lead. This fitting comprises a two-piece assembly in which one member has slits in its side to permit the lead to pass into an opening between the two members. One lead passes through each member from the opening between the members and is held by the member for attachment to contacts for the thermocouple. A novel terminal contact is also provided for the leads by inserting a circular, grooved contact over the bare end of a lead and thereafter crimping the contact at opposite sides of the groove, so that the contact is permanently connected with the wire by a simple crimping process.

It is therefore an object of the present invention to provide an over temperature control unit having a component held against a surface to sense its temperature and a cap member easily connectable with an outer surface and supporting said component by a spring.

Another object of the present invention is to provide an over temperature control unit for sensing the temperature of a tank surrounded by a spaced, outer jacket having an opening to receive the over temperature unit, said opening being of such size to receive a cap member for the opening and thereafter hold said cap member against the force of a spring connected between said cap member and the temperature sensing means.

A further object of the invention is to provide an over temperature control unit for a jacketed water heater having an inner tank, and an outer jacket with insulation therebetween, said control unit comprising a bimetallic unit placed adjacent the inner tank to sense the temperature and being biased against the inner tank by a spring connected with a cap member which is easily secured in an opening in the outer jacket.

These and other objects of the invention, not specifically set forth above, will become readily apparent from the accompanying drawing and description in which:

FIGURE 4 is a vertical section similar to FIGURE 2 illustrating the manner in which the cap member is installed and removed from the opening in the outer jacket and illustrating the bimetallic unit in position to override the main temperature control unit of the heater.

FIGURE 5 is a transverse vertical section along line 5—5 of FIGURE 2 and illustrating the lugs formed on the casing for the bimetallic unit to permit one end of the spring to be attached to the casing.

FIGURE 6 is an elevational view partly in section showing the novel fitting for connecting the leads of the over temperature control unit to the thermocouple lead of the heater.

FIGURE 7 is a horizontal section along line 7—7 of FIGURE 6 illustrating the slits in one part of the fitting which permits the leads to be introduced at an angle to the thermocouple lead.

FIGURE 8 is a vertical section through the novel electrical contact provided by the present invention and illustrating the manner in which the contact is slipped over the bare end of the lead during assembly.

FIGURE 9 is a vertical section similar to FIGURE 8 showing the manner in which two sides of the groove of the contact are crimped inwardly to attach the contact to the bare wire.

Figure 1:
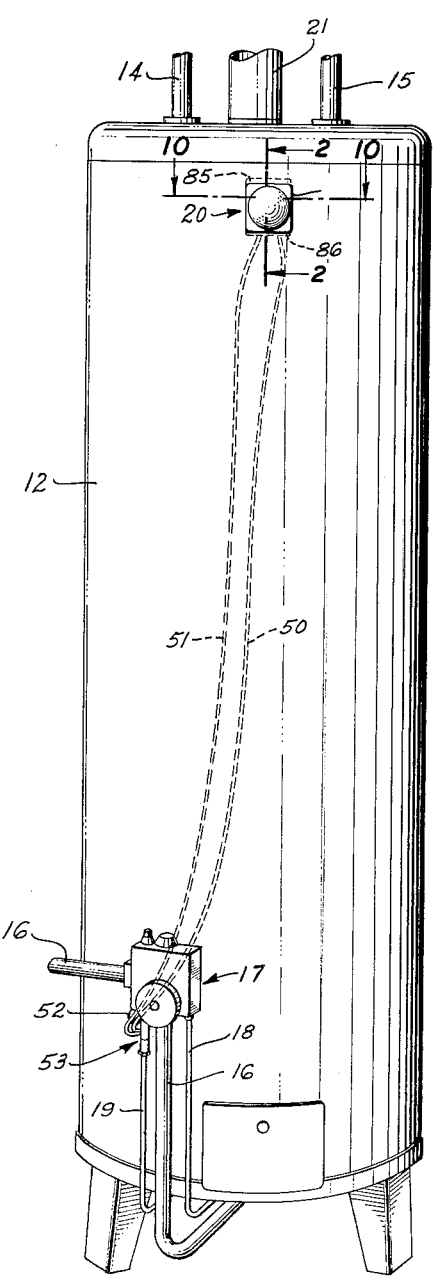
FIGURE 1 is an elevational view of a typical water heater showing the location of the water and gas lines and the location of the main temperature control unit and the over temperature control unit of present invention.
Figure 10:
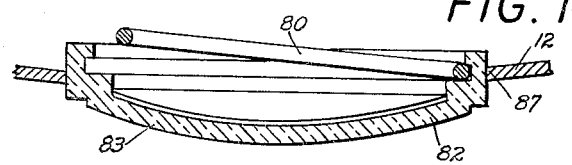

FIGURE 10 is a sectional view taken substantially on the line 10—10 in FIGURE 1 for purposes only of illustrating the relative dimensions of the closure means or cap 82 and the opening in the outer wall 12.

Referring to FIGURE 1, a preferred embodiment of the present invention is illustrated applied to a water heater of usual construction. The water heater 10 includes an inner tank 11, an outer jacket 12, and an insulation space 13 therebetween. The water to be heated is contained in the tank 11 and any suitable insulation can fill the space 13. Pipes 14 and 15 connect with the inner tank 11 and one of the pipes supplies cold water to the tank and the other pipe removes the hot water to its point of use. A gas burner (not shown) is located at the bottom of the inner tank and is supplied with gas through a passage 16, which connects with the main temperature control unit 17. A pilot light (not shown) for the burner is supplied with gas through a passage 18 to maintain the pilot flame. Also, a thermocouple unit (not shown) is located in the pilot flame to energize the power unit of the main control and has a lead 19 connecting the thermocouple with the main temperature control unit 17. Since it is possible that the temperature at the top of the inner tank can reach a dangerous level, the over temperature control unit 20 of the present invention is located at the top of the tank and is placed in series with the thermocouple lead 19 in order to break the thermocouple circuit if the temperature in the inner tank reaches a dangerous value. It is understood that the main temperature control unit 17 is of standard construction and can comprise a solenoid power unit for controlling a valve or other equivalent mechanism, and that the thermocouple and burner unit are also of standard well-known construction. A vent pipe 21 is connected with the top of the heater in order to vent the gas fumes from the burner.

The over temperature control unit 20 includes a bimetallic unit 22 which incorporates a temperature sensing means in the form of a bimetallic element 30 supported on suitable support means illustrated herein as a casing 23 formed of a top 24 and three sides 25, 26, and 27, so that the casing is open at one end and at the bottom. A pin 28 is securely attached to the top 24 and extends into the cover to support a plurality of control elements between the top 24 and the end washer 29. The bimetallic element or temperature sensing means 30 is attached to the pin 28 adjacent the end washer 29 and is separated by an insulating washer 31 from a contact arm 32, which is also supported by the pin 28. The end of the contact 32 makes electrical contact with a lead 33 also surrounding the pin 28 and is adjacent a second conducting washer 34. The end of a second contact member 36 is separated at the pin 28 from the washer 34 by an insulating washer 35, and this end of the contact 36 makes electrical connection with a lead 37, likewise held by the pin 28. A conducting washer 38 is also in contact with the lead 37 and is separated from a support member 39 by three insulating washers 40. The support member 39 is adjacent the top 24 and contains a slit having a threaded opening for receiving a set-screw 41. The cover plate has an opening 42 for receiving a notched end of the screw 41.

The end of the contact member 32 carries a contact 43 at one end which is normally against a contact 44 located inwardly from the end of the contact member 36. The end of the bimetallic element 30 carries an insulating arm 45 which bears against the end of the contact member 36. Also, an insulating arm 46 on the screw 41 is in contact with the contact member 32 at a location inwardly from the contact 43. The contact arm 32 is constructed to be continually biased toward the contact member 36 to maintain contact between the contacts 43 and 44. The bimetallic element 30 is constructed of metals which give a fast movement to the plug 45 towards the top 24 as the maximum temperature is reached. Thus, movement of the bimetallic element will serve to move the contract 44 away from the contact 43 and break the circuit to the leads 33 and 37 when the maximum temperature has been reached. The pin 46 serves to limit the movement of the contact 43 with the contact 44 during its movement by the pin 45, so that the position of the end of the pin 46 serves as an adjustment to regulate the amount of movement of the element 30 required to break the contacts. An opening 47 in the contact member 36 permits the pin 46 to pass through and engage the contact member 32.

Figure 2:
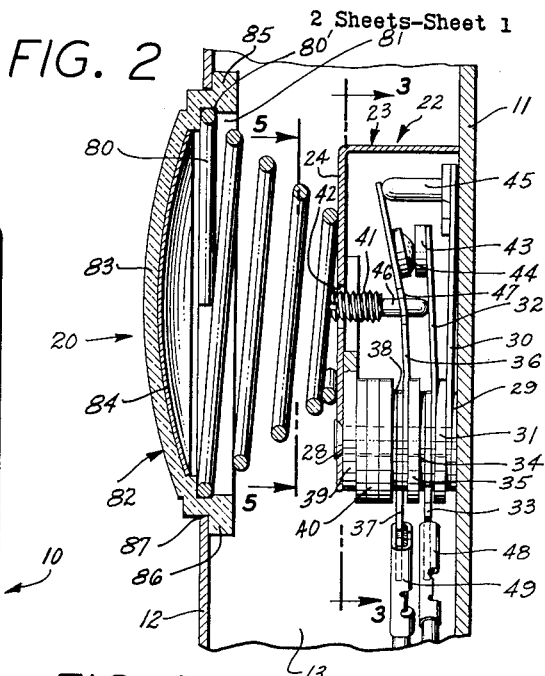
FIGURE 2 is a vertical section along line 2—2 of FIGURE 1 showing the construction of the over temperature control unit and illustrating the position of the various parts during normal use.
Figure 3:
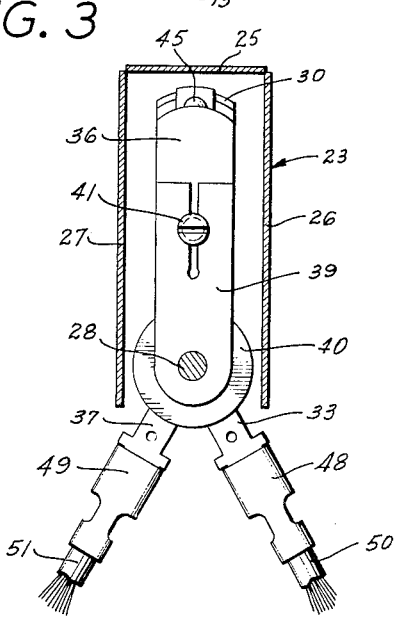
FIGURE 3 is a transverse vertical section along the line 3—3 of FIGURE 2 showing the construction of the bimetallic unit.

The flat ends of the leads 33 and 37 are inserted into metallic terminals 48 and 49, respectively, which serve to connect leads 50 and 51, respectively, to the leads 33 and 37. As illustrated in FIGURE 2, when the casing 23 is positioned against the wall of the inner tank 11, the side members 26 and 27 extend sufficiently beyond the end of the bimetallic element 30 to maintain a very slight space between the end of the element and the wall of the tank. The length of the sides 26 and 27 is selected to take care of the normal curvature of the tank and to compensate for any roughness in the surface of the tank at the location of the end of the bimetallic element and thus the casing 23 serves as a means for locating the temperature sensing or bimetallic element 30 adjacent the wall of the inner tank 11.

Referring to FIGURE 1, the leads 50 and 51 are shown extending from the over temperature control unit 20 through the insulation space 13 and through an opening 52 in the outer jacket in order to connect with the main control unit and the thermocouple lead 19 at a junction block fitting 53. The fitting 53, FIG. 6, consists of cylindrical body members 54 and 55 having reduced threaded ends 56 and 57, respectively. The member 54 has a circular threaded opening 58 connecting with a smaller opening 59 extending through the end 56 and the member 55 has a circular threaded opening 60 connecting with a smaller opening 61 extending through the end 57. The member 54 contains opposite slots 62 and 63 of sufficient width to permit the passage of the leads 50 and 51 into the opening 58. From the opening 58, the lead 51 passes through the opening 59 and connects with a contact 64 while the lead 50 passes through the opening 61 and connects with a contact 65.

In assembling the fitting 53, the end 56 is threaded into a sleeve 66 of the main temperature control unit 17 in order to force the contact 64 against a similar contact of the unit 17. During this assembly, the lead 51 is removed from the slot 62 to permit the member 54 to rotate and, after tightening, the lead 51 is replaced in the slot 62. The lead 50 is then placed in the slot 62 and the end 57 of the member 55 is threaded into the opening 58 of the member 54. The thermocouple lead 19 passes through a nut 67 which has a threaded end 68 adjacent a contact 69. In order to connect the lead 19 to the lead 50, the end 68 is threaded into the opening 60 of the member 55 until the contacts 65 and 69 are forced together between the threaded end 68 and the internal shoulder of the member 55. It is apparent that after the members 54 and 55 and the nut 67 have been secured together, the leads 19, 50, and 51 and the contacts 43 and 44 will be connected in series with the unit 17.

Each of the contacts 64, 65, and 69 can be constructed in the manner illustrated in FIGURES 8 and 9 for the contact 65. In FIGURE 8, an intermediate step in the construction of the contact 65 is illustrated, wherein the insulation on an end 70 of the lead 50 is removed and a circular metal contact 71, having a circular groove 72, is slipped on the end of the bare wire. In order to protect the metal contact from the element against which it is held in abutment, a fiber washer 73 and a thin metallic washer 74 are located around the insulation on the lead adjacent the metal contact 71. In order to attach the contact to the bare end 70, a crimp is placed in opposite sides in the groove 72 at locations 75 and 76 by a suitable tool. For instance, straight bars 75' and 76' can be forced against opposite positions of the groove to deform the groove inwardly at the points of contact. As illustrated in FIGURE 9, the pressure applied to the groove 72 causes the contact 71 to grip the bare wire at the point of the grooving action. Thus, this novel contact construction and method of construction makes it unnecessary to utilize solder or other means to attach the contact 71 to the end 70 of the lead 50.

While the contacts 43 and 44 are in a closed position, as illustrated in FIGURE 2, the thermocouple will be connected with the main control unit 17. However, when the bimetallic element 30 is moved in response to an excessive temperature at the top of the heater, the bimetallic element will move into the position illustrated in FIGURE 4 and break the contacts 43 and 44 to interrupt the thermocouple connection to the control unit 17, and thus shut off the gas supply to the burner. The fitting 53 makes it possible to quickly connect the leads 51 and 50 in series with the lead 19 and the unit 17 and the construction of the contacts 64, 65 and 69 makes it possible to quickly and firmly attach the contacts to the leads. While the leads are shown passing through the slot 62, both leads could pass through the slot 63 or one lead could pass through each slot.

A novel feature of the invention resides in the manner in which the bimetallic control unit 22 can be quickly attached to and detached from the heater and is held in position to measure the temperature, regardless of variations from heater to heater in the insulation space between the inner tank and the outer jacket. The top 24 of the casing 23 has four ears 77 stamped from the top 24 in the location illustrated in FIGURE 5. These ears stand upward and slant towards a common center and are sufficiently spaced apart to receive the smaller end 78 of a frusto-conical coil spring 79. The end 78 is first snapped within all of the ears 77 and then the spring is rotated so that end 78 will be tightened within the ears 77, because of the expanding diameter of the spring 79. The larger end 80 of the spring 79 snaps into a circular groove 80' located at the circumference of an opening 81 in the interior of a cap member or closure means 82. As illustrated in FIGURE 1, the cap member is square in shape and has a dome shaped portion 83 of clear plastic so that a label 84 can be inserted within the dome shaped portion 83 and clearly seen exteriorly of the cap. Ears 85 and 86 are connected with the upper and lower edges of the cap member 82, respectively. The sides of the member 82 form a square shape which is slightly smaller than a square opening 87 in the outer jacket 12. Also, the groove 80' is of slightly smaller diameter than the end 80 of the coil spring, so that the end 80 must be snapped into the groove 80' and the cap member can be twisted to tighten the grip of the spring at groove 80'.

Prior to the attachment of the over temperature control unit 20 to the heater, the cap member 82, spring 79 and unit 22 are all secured together as an integral unit with the spring 79 extended since it is not under compression. In assembling the heater, the leads 50 and 51 are attached to the openings 52 and 87 prior to assembly of the outer jacket and insulation on the shoe so that the ends of the leads will be accessible after the shoe is removed. The leads can then be quickly attached to the thermocouple lead 19 and the main control unit 17 at the fitting 53 in the manner previously described, and the terminals 48 and 49 of the leads 50 and 51 are available for attachment of the leads 33 and 37 of the bimetallic unit 22. After these leads are attached, the bimetallic control unit 22 is inserted through the opening 87 into contact with the inner tank 11. Thereafter, the cap member 82 is tilted to permit the ears 85 and 86 to clear the opening 87 and to permit the complete cap to be inserted into the insulation space 13. In FIGURE 4, the cap member is illustrated in an intermediate tilted position assumed during either removal or attachment of the cap member to the outer jacket. During attachment, after the tilted cap member has been inserted through the opening 87, it is straightened up so that the spring 79 will move the cap member until the ears 85 and 86 engage the inner surface of the jacket 12 at the top and bottom edges of the opening 87. It is understood that since no ears are placed on two of the straight sides of the cap member 82, the cap member will pass freely through the slightly enlarged square opening 87 if the cap member is tilted sufficiently to permit the sides with the extending ears to enter the opening. The normal installed position of the cap member is illustrated in FIGURE 2 and it is apparent that the spring 79 serves to hold the cap member in position and also serves to retain the bimetallic control unit 22 in engagement with the inner tank 11 in order to sense the temperature at this location. As illustrated in FIGURE 4, insulation 13' in the space 13 will completely surround the unit 22.

When it is desired to remove the unit 22, it is only necessary to push in on the cap member 82 and tilt the cap member sufficiently to allow the ears 85 and 86 to pass through the opening 87. The spring 79 is a nested type of coil spring which holds the unit 22 centered with respect to the cap member 82 and has the characteristic that its force remains fairly constant regardless of the amount of compression. Thus, it is apparent that the same over temperature control unit can be utilized in various types of heaters, regardless of any variation in the width of the insulation space 13 with the capacity of the heater, since the spring will be always under compression and apply a force to the unit 22.

By the present invention, a novel over temperature control switch is provided which is easy to install and automatically compensates for differences in the thickness of the space between the hot surface and the jacket surface. It is understood that the present invention is applicable to temperature measurement in any type of device where the temperature sensing unit must be positioned at an interior location. While one construction of a bimetallic temperature unit is illustrated, it is understood that other constructions and other types of sensing elements can be utilized. Also, the size and force of the spring can be varied to provide proper support of the over temperature control unit for various maximum and minimum spacings to be encountered by any particular unit. The shape and size of cap member 82 can also be varied and various devices can be utilized to attach the member to the outer surface. The novel junction block fitting 53 permits quick attachment of leads to various types of circuitry and the novel terminal contacts permit a firm connection between the contacts in the circuit. Thus, the fitting and contact construction are of general application in various instruments. Various other modifications are contemplated by those skilled in the art without departing from the spirit and scope of the invention as hereinafter defined by the appended claims.

What is claimed is:

1. A temperature control unit comprising a temperature sensing means for sensing the temperature at a first surface, said sensing means having support means for locating said sensing means adjacent said first surface, a second surface spaced from said first surface and having an opening therein to permit passage of said sensing means and support means, closure means for said opening, said closure means being insertable through said opening and having one dimension larger than the corresponding dimension of said opening, and spring means connected between said support means and said closure means for holding said sensing means adjacent said first surface and said closure means against said second surface at said one dimension of said closure means.

2. A temperature control unit as defined in claim 1 wherein said spring means comprises a coil spring, a plurality of projections formed on said support means for receiving one end of said spring, and a groove in said closure means to receive the other end of said spring.

3. In an apparatus for sensing the temperature of an inner surface of a structure having an outer surface spaced outwardly from said inner surface, said outer surface having an opening therein, the combination of: a temperature sensing unit insertable into the space between said inner and outer surfaces through said opening in said outer surface, said unit including temperature sensing means engageable with said inner surface opposite said opening; a spring insertable into said space through said opening and having an inner end in engagement with said temperature sensing unit; and a closure for said opening insertable into said space through said opening and seatable against said outer surface adjacent the periphery of said opening to prevent movement of said closure outwardly through said opening, the outer end of said spring being in engagement with said closure so that said spring is compressed to bias said temperature sensing means into engagement with said inner surface.

4. Apparatus as set forth in claim 3 in which said unit includes means fastening said unit to one end of said spring.

5. In an apparatus for sensing the temperature of an inner surface of a structure having an outer surface spaced outwardly from said inner surface, said outer surface having an opening therein, the combination of: a temperature-sensing unit insertable into the space between said inner and outer surfaces through said opening in said outer surface, said unit including temperature-sensing means responsive to temperature conditions inside said inner surface, said unit being engageable with said inner surface opposite said opening; a spring insertable into said space through said opening and having an inner end in engagement with said temperature-sensing unit; and a closure for said opening insertable into said space through said opening and seatable against said outer surface adjacent the periphery of said opening to prevent movement of said closure outwardly through said opening, the outer end of said spring being engageable with said closure so that said spring is compressed to bias said temperature-sensing means into engagement with said inner surface.

References Cited in the file of this patent

UNITED STATES PATENTS

| Number | Name | Date |
|---|---|---|
| 929,081 | Enterline | July 27, 1909 |
| 1,510,409 | Maybaum | Sept. 30, 1924 |
| 1,599,356 | Auspitzer | Sept. 7, 1926 |
| 1,619,636 | Sauvage | Mar. 1, 1927 |
| 1,864,887 | Bodenstab | June 28, 1932 |
| 2,237,808 | Berg | Apr. 8, 1941 |
| 2,525,449 | Coutant | Oct. 10, 1950 |
| 2,542,435 | Russell | Feb. 20, 1951 |
| 2,549,461 | Haller | Apr. 17, 1951 |
| 2,584,458 | Harlbut et al. | Feb. 5, 1952 |
| 2,605,314 | Schelke | July 29, 1952 |
| 2,670,902 | Dotson | Mar. 2, 1954 |
| 2,686,359 | Spencer | Aug. 17, 1954 |
| 2,706,283 | Cahn | Apr. 12, 1955 |
| 2,781,977 | Stanley et al. | Feb. 19, 1957 |